Figure 1:
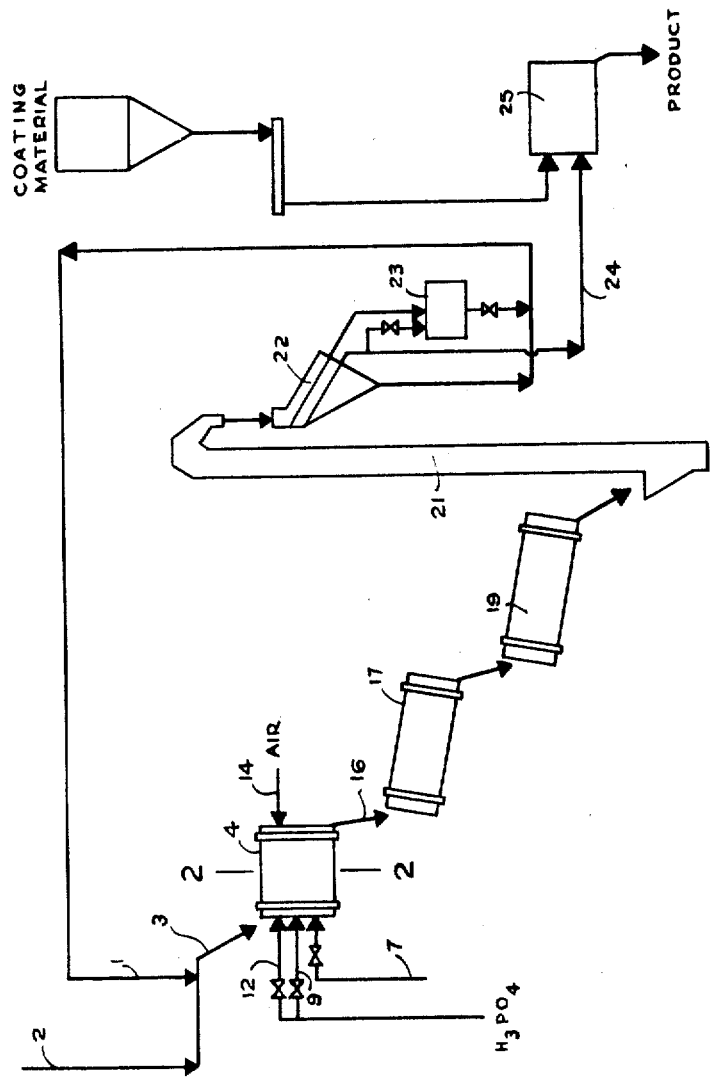

Oct. 24, 1961  T. P. HIGNETT ET AL  3,005,696
PROCESS FOR PRODUCTION OF AMMONIUM PHOSPHATE FERTILIZERS
Filed Dec. 6, 1957

Travis P. Hignett
Milton R. Siegel
Robert S. Meline
Glenn M. Blouin  INVENTORS

BY Bentley C. Morrow
Attorney

United States Patent Office 3,005,696
Patented Oct. 24, 1961

3,005,696
PROCESS FOR PRODUCTION OF AMMONIUM PHOSPHATE FERTILIZERS
Travis P. Hignett, Sheffield, and Milton R. Siegel, Robert S. Meline, and Glenn M. Blouin, Florence, Ala., assignors to Tennessee Valley Authority, a corporation of the United States
Filed Dec. 6, 1957, Ser. No. 701,275
7 Claims. (Cl. 71—64)
(Granted under Title 35, U.S. Code (1952), sec. 266)

The invention herein described may be manufactured and used by or for the Government for governmental purposes without the payment to us of any royalty therefor.

This invention is an improved process for the manufacture of granular high-analysis fertilizers having ammonium phosphate as their principal phosphatic component. Such fertilizers also may contain ammonium nitrate, ammonium sulfate, urea potash salts, and trace elements if desired.

The high analysis to be obtained and the high water solubility of the products have led to the use of mixtures of amonium phosphate with ammonium nitrate, other high-analysis fertilizer salts such as potassium chloride, or urea as fertilizers. However, it has been found that a fertilizer prepared by mixing these salts is expensive to produce. In a mixture of these salts there is also a pronounced tendency toward segregation during storage and during application to the soil.

To overcome the tendency toward segregation it had been proposed to form such mixtures into homogeneous granules. Prior to our invention, this had been accomplished by neutralizing a fluid mixture of phosphoric acid and ammonium nitrate with ammonia in a tank while agitating it. The resulting mixture was cooled, mixed with recycled fines, and granulated in a pugmill. This process required separate neutralization and granulation steps and equipment; control of granulation was difficult; poor granulation often resulted; and the process was expensive to operate.

It is an object of this invention to provide a process for the manufacture of granular high-analysis fertilizers containing ammonium phosphate as the principal phosphatic component, wherein control of granulation is simple and easy, and good granulation is obtained consistently.

Another object is to provide such process in which readily available cheap materials may be used, and in which both labor costs and equipment costs are low.

Still another object is to provide such process in which a homogeneous, closely sized, granular product is obtained, and in which the product may be stored in bulk without excessive caking or sticking.

Another object is to provide such process in which wet-process phosphoric acid may be used in standard equipment readily available in most fertilizer factories.

Another object is to provide a process for the preparation of granular high-analysis fertilizers from phosphoric acid and commercial ammoniating solutions.

Still another object is to provide such process in which great flexibility is inherent, permitting the use of a wide variety of ratios of $N:P_2O_5:K_2O$ in the product.

Other objects and advantages will become apparent as this disclosure proceeds.

We have found that high-analysis fertilizers having ammonium phosphates as their principal phosphatic constituent may be made from the cheapest materials—ammoniating fluids and phosphoric acid—and granulate well without going through a slurry or pasty stage, provided the reaction between phosphoric acid and ammoniating fluid is carried out in a bed of rolling solid particles such as recycled fines in a horizontally inclined rotating drum under proper conditions of moisture content and temperature.

We have found that these objects are attained in a process which comprises continuously introducing a substantial proportion of fines recycled from a later sizing step into a horizontally inclined rotating drum; maintaining a bed of rolling particles of solid materials in the drum; continuously introducing phosphoric acid into the bed; continuously introducing an ammoniating fluid into the bed in quantity sufficient to neutralize the phosphoric acid to a degree betwen monoammonium phosphate and diammonium phosphate; controlling granulation in the bed by controlling the temperature and proportions of fines recycled; continuously withdrawing granulated material from the drum; drying and sizing the resulting granules; and recycling about 30 to 80 percent of the granules throughout as fines to the first rotating drum.

The solid materials introduced into the first rotating drum as feed, in addition of recycled fines, may contain solid ammonium nitrate, potash salts, amonium sulfate, trace elements, and/or a little concentrated superphosphate, oridnary superphosphate, or phosphate rock. We have found that many formulations having a mixture of ammonium phosphate and ammonium nitrate and/or urea as the principal component do not granulate well when a pure phosphoric acid, such as electric-furnace acid, is used. When a formulation of this kind is to be produced, we prefer to use wet-process phosphoric acid. If electric-furnace acid is to be used, we prefer to add a little fine phosphate rock or iron ore to the acid. The impurities derived from phosphate rock or iron ore in the electric-furnace acid cause granulation to occur. Since the solids present in the acid often clog the openings of a stationary distributor located beneath the bed of rolling particles, we prefer to spray acid containing such impurities onto the bed, using a suitable nozzle. However, the acid may be introduced beneath the bed of particles with some types of stationary distributors.

The term 'impure phosphoric acid" is used in this specification and claims in a restricted sense. This term refers to wet-process phosphoric acid; to any phosphoric acid containing phosphate rock, superphosphate, or concentrated superphosphate in quantity sufficient to furnish about 5 to 10 percent of the total $P_2O_5$ content of such mixture; and to any phosphoric acid containing iron ore in quantity sufficient to amount to about 10 to 20 pounds per ton of product of the present process. The term does not refer to minor amounts of other impurities, which may or may not be present.

With some formulations, electric-furnace acid or impure phosphoric acid gives equally good results. Sulfuric acid may be added with the phosphoric acid when required for a particular formulation without interfering with granulation.

The ammoniating fluid used may be either ammonia or one of the common commercial ammoniating solutions containing ammonium nitrate, urea, ammonium carbamate or mixtures of these compounds in addition to ammonia.

The term "ammoniating fluid" is used in this specification in a limited sense to mean anhydrous ammonia, or concentrated aqueous ammonia, or a concentrated aqueous solution of ammonia and ammonium nitrate, or a concentrated aqueous solution of ammonia, urea, and ammonium carbamate, or a mixture of these materials.

The moisture content of the material in the first drum is maintained at approximate proper granulation level by selecting concentrations of phosphoric acid and ammoniating fluid to give the proper moisture content.

Strong commercial acid, usually containing about 50 percent $P_2O_5$, is preferred, since the quantity of recycled material required is lowered with increasing acid strength. Any strength in the range from about 30 percent to 60 percent $P_2O_5$ is usable. The moisture content of material leaving the drum should be about 1.5 percent to 7 percent. The heat required is furnished by heat of reaction. Good granulation usually is obtained when the temperature of the material leaving the first rotating drum is maintained in the range from about 150° to 210° F. Temperature and moisture control is achieved principally by controlling the proportion of relatively cool, dry, recycled fines fed; and a current of cool air also may be passed over the surface of the bed in the first drum if necessary. Usually, air is not required.

Figure 2:
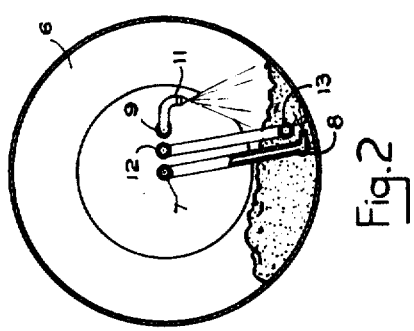

FIGURE 1 in the attached drawing illustrates diagrammatically a process employing principles of our invention. FIGURE 2 is a cross section of drum 4 of FIGURE 1 on the line 2—2. With reference thereto, fines recycled from a later sizing step are fed at 1 to any suitable means for conveyance, illustrated as line 3. Solid ammonium nitrate, potassium chloride, potassium sulfate, ammonium sulfate, superphosphate, or trace elements as may be necessary to balance the particular grade of fertilizer being prepared also may be fed into line 3 at 2. Solid materials, carried by line 3, are introduced at a controlled rate into a first rotating drum 4. Drum 4 is equipped with annular end members 6, shown in FIGURE 2, which maintain a bed of rolling particles in drum 4. Drum 4 and its auxiliary equipment preferably are constructed substantially as is shown in U.S. Patent 2,741,-545, Nielson.

An ammoniating fluid, described above, is introduced beneath the surface of the bed in drum 4 at controlled rate via line 7 and distributor 8. Phosphoric acid of suitable concentration is introduced continuously into drum 4, either by line 9 and spray 11 or by line 12 and distributor 13 located below the surface of the bed. Use of distributor 13 is the method of choice when the phosphoric acid fed does not contain sufficient solids to clog openings in the distributor. This will ordinarily be true when wet-process phosphoric acid or electric-furnace acid is used without addition of phosphate rock, superphosphate, or iron ore. However, many formulations of essentially ammonium nitrate-ammonium phosphate fertilizers do not granulate well when electric-furnace acid is fed. In that case, if only electric-furnace acid is available, it may be necessary to add fine phosphate rock to electric-furnace acid in quantity sufficient to supply about 5 to 10 percent of the $P_2O_5$ content of the mixture in order to have sufficient impurities derived from phosphate rock present to enable proper granulation. When this is necessary the acid may contain enough solids to clog openings in distributor 13, and it becomes impractical to introduce the acid beneath the bed. The phosphoric acid containing solids is, in that case, fed via line 9 and spray 11 onto the surface of the bed of rolling particles. We have found that good granulation may be obtained in this way also.

Wet-process phosphoric acid is our preferred material for acidulation. With this material, proper plasticity for granulation is attained in all fertilizer grades when the product contains a mixture of ammonium phosphate with ammonium nitrate and/or urea as its principal constituent.

The quantities of phosphoric acid and ammoniating fluid fed are controlled so that neutralization proceeds to a degree between monoammonium phosphate and diammonium phosphate; that is to say, the neutralization proceeds to a degree such that approximately equal proportions of monoammonium phosphate and diammonium phosphate are formed. The heat of reaction supplies all heat necessary to raise the temperature to a point at which sufficient plasticity for granulation is attained. This temperature is in the range from about 150° F. to 210° F. for most formulations. Plasticity—and consequently the degree of granulation obtained—is controlled by controlling the proportions of fines recycled, supplemented when necessary by passing a current of cool air, introduced at 14, across the bed in drum 4. Usually good granulation is obtained in drum 4. Granulated material is withdrawn and introduced at 16 into a second rotating drum 17, where it is rolled to complete granulation if necessary. Drum 17 usually is not required, but may be used to compact granules. Moisture is evolved in both drums 4 and 17. Granulated material is withdrawn from drum 17 and is introduced into a third rotating drum 19. This drum serves as a dryer, rolling the granules in contact with warm air until they are dried and hardened.

Dry granules are withdrawn and passed by any suitable means for conveyance, illustrated as a conveyor 21, to sizing equipment such as a set of screens 22. Here, the material is separated into a product-size fraction, an oversize fraction, and fines. The oversize material is retained on the surface of the top screen; the product material and fines pass through the top screen to the surface of the bottom screen which collects the product material and through which pass the fines. The oversize fraction is crushed in crusher 23, is combined with fines, and recycled to line 3. If necessary, some of the product-size material also may be crushed and added to the recycled fines.

The product-size fraction is withdrawn and passed via line 24 to a coating drum 25, where the granules are given a light coating of clay, kieselguhr, or other similar material to prevent sticking. The coated granules are then withdrawn to storage or use. Coating is optional. It is not required with many formulations.

The recycle rate in our process is high—about 30 to 80 percent of the throughput—but this is not disadvantageous in this method, since the heat required for granulation is derived entirely from heat of reaction and the cost of recycle is repaid many times by the low cost of raw materials. The granular product has rather unusual properties in that it requires less drying than other similar mixtures of ammonium phosphate, is nonhygroscopic, can be stored in bulk without excessive caking, and does not develop appreciable bag set during long periods of storage.

As shown by the general description above, this process is very versatile, utilizes a variety of the cheapest materials, and has inherent low costs for labor and equipment. We have made a large variety of products in this manner, including 16–48–0, 28–14–0, 30–10–0, 16–22–16, 11–22–22, 17–17–17, 15–30–15, and 7–28–28. Other high-analysis formulas may be used with excellent results and with the same desirable properties of products.

*Example I*

A pilot plant was constructed substantially as shown in the attached drawing. Both phosphoric acid and ammoniating fluid were fed beneath the surface of the bed of rolling particles in the first drum through separate distributors corresponding to 13 and 8 in FIGURE 2. These distributors were located about 4 inches from the inner surface of the drum and were parallel to the axis of rotation. The distributor for ammoniating fluid was a full-length distributor constructed as shown in the drawing. The acid distributor was located adjacent to the ammoniating-fluid distributor and was 7 inches shorter than distributor 8. It was a ¼ inch stainless steel pipe having 24 openings ¹⁄₁₆ inch in diameter spaced about 1 inch apart.

Electric-furnace phosphoric acid or wet-process acid was used in various runs. Potassium salts, when desired, and recycled fines were fed through volumetric feeders. Medium-sized potassium chloride (50 percent −35 mesh) was used in most runs. Our references to mesh sizes in this and subsequent examples of course refer to the mesh sizes of standard Tyler screens. Granulation was controlled by controlling the recycle rate. The amount of recycle required varied from about 1000 to 7000 pounds per ton of product, depending on the formulation. Usually, the amount of oversize and undersize granules was insufficient to furnish all recycle required, and it was necessary to crush some product-size material in order to have sufficient recycle fines. It was obvious that recycle requirements could be reduced by the use of ammoniating solutions containing less water.

The granular product leaving the first drum contained 3 to 6 percent moisture; it was rolled to complete granulation and dried to less than 1 percent moisture. The product was then screened to separate +6 mesh material as oversize and −12 or −20 mesh material as fines. The oversize material was crushed, mixed with the fines and some crushed onsize product when necessary, and was recycled to the first drum.

This method was shown to have excellent versatility for the production of a wide range of fertilizer grades from a variety of raw materials. About 7 pounds of ammonia per unit of $P_2O_5$ was fixed by the phosphoric acid. Ammonium sulfate, potassium sulfate, or sulfuric acid was added when products containing sulfur were desired. Satisfactory results were obtained in runs in which nitrogen was supplied as anhydrous ammonia and solid ammonia nitrate, ammonia-ammonium nitrate solution, ammonia-urea-ammonium carbamate solution, or a combination of ammonia and solution.

Most runs were made at production rates ranging from about 1000 to 2000 pounds per hour. Formulations for some of the products made are given in the following table.

| Material | Pounds per ton of product | | | | | |
|---|---|---|---|---|---|---|
| | 17-17-17 | 15-15-15 | 11-22-22 | 10-48-0 | 30-10-0 | 28-14-0 |
| Phosphoric acid, wet process [1] | 625 | 425 | 809 | 1,767 | 368 | 516 |
| Ammoniating solution | [2] 826 | [2] 482 | [3] 541 | [3] 242 | 0 | 0 |
| Anhydrous ammonia | 0 | 0 | 0 | 275 | 68 | 100 |
| Ammonium nitrate [4] | 0 | 0 | 0 | 0 | 1,557 | 1,368 |
| Ammonium sulfate [5] | 0 | 500 | 0 | 0 | 0 | 0 |
| Sulfuric acid [6] | 112 | 0 | 0 | 0 | 0 | 0 |
| Potassium chloride [7] | 567 | 500 | 733 | 0 | 0 | 0 |
| Concentrated superphosphate [8] | 0 | 150 | 0 | 0 | 0 | 0 |
| Iron ore | 0 | 0 | 0 | 0 | 10 | 10 |
| Filler | 0 | 0 | 51 | 0 | 0 | 20 |
| Conditioner | 44 | 53 | 80 | 88 | 62 | 80 |
| Recycle | 4,500 | 2,000 | 2,500 | 7,000 | 1,500 | 1,500 |

| Material | Pounds per ton of product | | | | |
|---|---|---|---|---|---|
| | 8-16-32 | 6-18-36 | 7-28-28 | 15-30-15 | 15-60-0 |
| Phosphoric acid, wet process [1] | 589 | 663 | 1,031 | 1,104 | 1,840 |
| Ammoniating solution | [9] 362 | [10] 103 | 0 | [11] 669 | 0 |
| Anhydrous ammonia | 0 | 96 | 173 | 0 | 370 |
| Ammonium nitrate [4] | 0 | 0 | 0 | 0 | 0 |
| Ammonium sulfate [5] | 0 | 0 | 0 | 0 | 0 |
| Sulfuric acid [6] | 0 | 0 | 0 | 0 | 0 |
| Potassium chloride [7] | 1,067 | 1,200 | 933 | 500 | 0 |
| Concentrated superphosphate [8] | 0 | 0 | 0 | 0 | 0 |
| Iron ore | 20 | 0 | 0 | 27 | 145 |
| Filler | 0 | 0 | 0 | 0 | 0 |
| Conditioner | 84 | 72 | 52 | 80 | 0 |
| Recycle | 1,500 | 2,000 | 2,000 | 2,000 | 8,000 |

[1] 75 percent $H_3PO_4$.
[2] 19.0 percent free ammonia, 74.0 percent ammonium nitrate, 7.0 percent water, 41.4 percent total nitrogen.
[3] 22.2 percent free ammonia, 65.0 percent ammonium nitrate, 12.8 percent water, 41.0 percent total nitrogen.
[4] 35.0 percent nitrogen.
[5] 20.5 percent nitrogen.
[6] 93.0 percent $H_2SO_4$.
[7] 60.0 percent $K_2O$.
[8] 46.0 percent $P_2O_5$.
[9] 25.0 percent free ammonia, 69.0 percent ammonium nitrate, 6.0 percent water, 44.8 percent total nitrogen.
[10] 26.2 percent free ammonia, 55.5 percent ammonium nitrate, 18.3 percent water, 41.0 percent total nitrogen.
[11] 24.1 percent free ammonia, 43.3 percent urea, 15.0 percent ammonium carbamate, 17.6 percent water, 45.5 percent total nitrogen.

Sulfuric acid was used in preparing the 17-17-17 product, thus obtaining nitrogen in the form of ammonium sulfate to give the 1:1:1 ratio. Ammonia-ammonium nitrate solution was used to supply all nitrogen in the 17-17-17, 11-22-22, and 8-16-32 products. A mixture of such solution and ammonia, introduced through the same distributor, was used in the 6-18-36 and the 16-48-0 products. Solid ammonium nitrate and ammonia were used in the 28-14-0 and the 30-10-0 formulations. Anhydrous ammonia was the ammoniating fluid used in preparing 7-28-28. The 15-30-15 product was prepared using an ammonia-urea-ammonium carbamate solution.

The very high nitrogen products such as 28-14-0 and 30-10-0 were not sufficiently plastic for granulation with electric-furnace phosphoric acid. Excellent granulation was obtained by premixing the acid with about 10 to 20 pounds of iron ore per ton of product.

The granules produced in the various tests were round and quite hard. Bag-storage tests were made on a number of these materials. When the products were dried to 1 percent moisture or less, and conditioned with about 2 to 4 percent clay or kaolin, no caking and little bag set occurred during 3 months' storage. Some of the products developed bag set after 9 months' storage, but usually there were no lumps present after the standard drop test. Bulk-storage tests were made on the conditioned product in which a few tons were held in an open bin in an unheated building for 3 months. A light crust formed on the surface of the pile; underneath, the material was dry and free flowing.

Example II

The apparatus described in Example I was used also in the preparation of 16–22–22, 11–22–22, 7–28–28, and 17–17–17. Electric-furnace phosphoric acid containing about 78 percent $P_2O_5$ was used in the preparation of the first three of these formulations. Good granulation was obtained by adding about 98 to 99 pounds of phosphate rock to 1000 pounds of phosphoric acid and spraying the resulting mixture onto the surface of the bed of rolling particles in the first rotating drum.

In the preparation of 17–17–17, sulfuric acid was required to balance the formulation. The sulfuric and phosphoric acids were mixed, and concentrated superphosphate in proportion of about 200 pounds per 1000 pounds of mixed acid was added to the acid and sprayed onto the surface of the bed. The granulated material withdrawn from the first drum contained approximately 6 percent water. This was dried to 1 percent in a second drum. The dry granules were cooled and screened to obtain a very closely sized (−6 to +10 mesh) product. The remainder of the material was recycled. The following table gives operating data typical of those obtained in a number of runs.

| Material | Pounds per ton of product | | | |
|---|---|---|---|---|
| | 16–22–16 | 11–22–22 | 7–28–28 | 17–17–17 |
| Phosphoric acid, 78% $H_3PO_4$ | 740 | 740 | 942 | 512 |
| Phosphate rock, 30% $P_2O_5$ | 73 | 73 | 93 | 0 |
| Nitrogen solution | ¹ 870 | ² 542 | 0 | ¹ 926 |
| Potassium chloride, 60% $K_2O$ | 533 | 733 | 933 | 667 |
| Conditioner | 75 | 80 | 0 | 23 |
| Filler | 0 | 48 | 50 | 0 |
| Anhydrous ammonia | 0 | 0 | 174 | 0 |
| Concentrated superphosphate (46% $P_2O_5$) | 0 | 0 | 0 | 122 |
| Sulfuric acid (93% $H_2SO_4$) | 0 | 0 | 0 | 104 |
| Recycle | 6,000 | 2,500 | 2,000 | 4,500 |

¹ 16.6 percent free ammonia, 66.8 percent ammonium nitrate, 16.6 percent water.
² 22.2 percent free ammonia, 65.0 percent ammonium nitrate, 12.8 percent water.

We claim as our invention:

1. A one-step continuous process for the production of granular fertilizer of about 15–50–0 grade which comprises continuously introducing fines of less than about 12-mesh size recycled from a later mentioned sizing step into the upper end of a horizontally inclined rotating drum; continuously introducing impure phosphoric acid into the upper end of said rotating drum at a controlled rate; continuously introducing ammoniating fluid into the upper end of said drum at a rate to neutralize the phosphoric acid to a degree such that approximately equal proportions of monoammonium phosphate and diammonium phosphate are formed; maintaining a bed of rolling discrete particles in the drum; continuously withdrawing granulated material from the lower end of the drum at a temperature in the range from about 150° F. to 210° F.; supplying substantially all of the heat for maintaining said temperature range from the heat of reaction of the reactants; maintaining the moisture content of granulated material leaving the drum in the range from about 1.5 percent to 7.0 percent; sizing the withdrawn granular material; separating the fine portion thereof; separating a portion of product-size material; crushing the remaining portion of product-size material and all the over-size material and recycling said crushed material together with said fine portion as fines to the rotating drum.

2. A one-step continuous process for the production of granular fertilizer of about 17–17–17 grade which comprises continuously introducing fines of less than about 12-mesh size recycled from a later mentioned sizing step and a potassium salt, said potassium salt selected from the group consisting of potassium chloride and potassium sulfate, in quantity sufficient to furnish the $K_2O$ requirement into the upper end of a horizontally inclined rotating drum; continuously introducing impure phosphoric acid and sulfuric acid in quantity sufficient to balance the formulation in the rotating drum at the upper end thereof at a controlled rate; continuously introducing ammoniating fluid into the upper end of said drum at a rate to neutralize the phosphoric acid to a degree such that approximately equal proportions of monoammonium phosphate and diammonium phosphate are formed; maintaining a bed of rolling discrete particles in the drum; continuously withdrawing granulated material from the lower end of the drum at a temperature in the range from about 150° F. to 210° F.; supplying substantially all of the heat for maintaining said temperature range from the heat of reaction of the reactants; maintaining the moisture content of granulated material leaving the drum in the range from about 1.5 percent to 7.0 percent; sizing the withdrawn granular material; separating the fine portion thereof; separating a portion of product-size material; crushing the remaining portion of product-size material and all the over-size material and recycling said crushed material together with said fine portion as fines to the rotating drum.

3. A one-step continuous process for the production of granular fertilizer of about 30–10–0 grade which comprises continuously introducing fines of less than about 12-mesh size recycled from a later mentioned sizing step and solid ammonium nitrate in quantity sufficient to balance the formulation into the upper end of a horizontally inclined rotating drum; continuously introducing impure phosphoric acid into the upper end of the drum at a controlled rate; continuously introducing ammoniating fluid into the upper end of said drum at a rate to neutralize the phosphoric acid to a degree such that approximately equal proportions of monoammonium phosphate and diammonium phosphate are formed; maintaining a bed of rolling discrete particles in the drum; continuously withdrawing granulated material from the lower end of the drum at a temperture in the range from about 150° F. to 210° F.; supplying substantially all of the heat for maintaining said temperature range from the heat of reaction of the reactants; maintaining the moisture content of granulated material leaving the drum in the range from about 1.5 percent to 7.0 percent; sizing the withdrawn granular material; separating the fine portion thereof; separating a portion of product-size material; crushing the remaining portion of product-size material and all the over-size material; and recycling said crushed material together with said fine portion as fines to the rotating drum.

4. A one-step continuous process for the production of granular fertilizer of about 11–22–22 grade which comprises continuously introducing fines of less than about 12-mesh size recycled from a later mentioned sizing step and solid potassium chloride in quantity sufficient to balance the formulation into the upper end of a horizontally inclined rotating drum; continuously introducing impure phosphoric acid into the upper end of the drum at a controlled rate; continuously introducing ammoniating fluid into the upper end of said drum at a rate to neutralize the phosphoric acid to a degree such that approximately equal proportions of monoammonium phosphate and diammonium phosphate are formed; maintaining a bed of rolling discrete particles in the drum; continuously withdrawing granulated material from the lower end of the drum at a temperature in the range from about 150° F. to 210° F.; supplying substantially all of the heat for maintaining said temperature range from the heat of reaction of the reactants; maintaining moisure content of granulated material leaving the drum in the range from about 1.5 percent to 7.0 percent; sizing the withdrawn granular material; separating the fine portion thereof; separating a portion of product-size material; crushing the remaining portion of product-size material and all the over-size material; and recycling said crushed material together with said fine portion as fines to the rotating drum.

5. A one-step continuous process for the production of granular fertilizer of about 15-30-15 grade which comprises continuously introducing fines of less than about 12-mesh size recycled from a later mentioned sizing step and solid potassium chloride in quantity sufficient to balance the formulation into the upper end of a horizontally inclined rotating drum; continuously introducing impure phosphoric acid into the upper end of the drum at a controlled rate; continuously introducing ammoniating fluid into the upper end of said drum at a rate to neutralize the phosphoric acid to a degree such that approximately equal proportions of monoammonium phosphate and diammonium phosphate are formed; maintaining a bed of rolling discrete particles in the drum; continuously withdrawing granulated material from the lower end of the drum at a temperature in the range from about 150° F. to 210° F.; supplying substantially all of the heat for maintaining said temperature range from the heat of reaction of the reactants; maintaining moisture content of granulated material leaving the drum in the range from about 1.5 percent to 7.0 percent; sizing the withdrawn granular material; separating the fine portion thereof; separating a portion of product-size material; crushing the remaining portion of product-size material and all the over-size material; and recycling said crushed material together with said fine portion as fines to the rotating drum.

6. A one-step continuous process for the production of granular high-analysis fertilizer having ammonium phosphate as its principal phosphatic component which comprises continuously introducing a material selected from the group consisting of ammonium nitrate, ammonium sulfate, potassium chloride, and mixtures thereof, together with a substantial portion of fines of less than about 12-mesh size recycled from a later mentioned sizing step into the upper end of a horizontally inclined rotating drum; continuously introducing impure phosphoric acid into the upper end of the drum; continuously introducing an ammoniating fluid into the upper end of the drum in quantity sufficient to neutralize the phosphoric acid to a degree such that proportions of monoammonium phosphate and diammonium phosphate are formed; maintaining a bed of rolling discrete particles in the drum; continuously withdrawing granular material from the lower end of the drum at a temperature in the range from about 150° F. to 210° F.; supplying substantially all of the heat for maintaining said temperature range from the heat of reaction of the reactants; maintaining moisture content of granular material leaving the drum in the range from about 1.5 percent to 7.0 percent; sizing the withdrawn granular material; separating the fine portion thereof; separating a portion of product-size material; crushing the remaining portion of product-size material and all the over-size material; and recycling said crushed material together with said fine portion as fines to the rotating drum.

7. A one-step continuous process for the production of granular high-analysis fertilizer having ammonium phosphate as its principal phosphatic component which comprises continuously introducing a substantial portion of fines of less than about 12-mesh size recycled from a later mentioned sizing step into the upper end of a horizontally inclined rotating drum; continuously introducing impure phosphoric acid into the upper end of the drum; continuously introducing an ammoniating fluid into the upper end of the drum in quantity sufficient to neutralize the phosphoric acid to a degree such that proportions of monoammonium phosphate and diammonium phosphate are formed; maintaining a bed of rolling discrete particles in the drum; continuously withdrawing granular material from the lower end of the drum at a temperature in the range from about 150° F. to 210° F; supplying substantially all of the heat for maintaining said temperature range from the heat of reaction of the reactants; maintaining moisture content of granular material leaving the drum in the range from about 1.5 percent to 7.0 percent; sizing the withdrawn granular material; separating the fine portion thereof; separating a portion of product-size material; crushing the remaining portion of product-size material and all the over-size material; and recycling said crushed material together with said fine portion as fines to the rotating drum.

References Cited in the file of this patent

UNITED STATES PATENTS

| | | |
|---|---|---|
| 2,598,658 | Procter et al. | May 27, 1952 |
| 2,600,253 | Lutz | June 10, 1952 |
| 2,614,040 | Kaikinger | Oct. 14, 1952 |
| 2,680,680 | Coleman | June 8, 1954 |
| 2,783,140 | Hignett et al. | Feb. 26, 1957 |
| 2,857,262 | Graham | Oct. 21, 1958 |

Disclaimer 3,005,696.—*Travis P. Hignett*, Sheffield, and *Milton R. Siegel, Robert S. Meline*, and *Glenn M. Blouin*, Florence, Ala. PROCESS FOR PRODUCTION OF AMMONIUM PHOSPHATE FERTILIZERS. Patent dated Oct. 24, 1961. Disclaimer filed Oct. 13, 1964, by the assignee, *Tennessee Valley Authority*.

Hereby enters this disclaimer to claims 1 through 5 of said patent.

[*Official Gazette January 26, 1965.*]

UNITED STATES PATENT OFFICE
Certificate

Patent No. 3,005,696                          Patented October 24, 1961

Travis P. Hignett, Milton R. Siegel, Robert S. Meline, and Glenn M. Blouin

Application having been made jointly by Travis P. Hignett, Milton R. Siegel, Robert S. Meline, and Glenn M. Blouin, the inventors named in the patent above identified; and Tennessee Valley Authority, a corporation of the United States, the assignee, for the issuance of a certificate under the provisions of Title 35, Section 256 of the United States Code, deleting the names of Milton R. Siegel, Robert S. Meline and Glenn M. Blouin from the patent as joint inventors, and a showing and proof of facts satisfying the requirements of the said section having been submitted, it is this 24th day of January 1967, certified that the names of the said Milton R. Siegel, Robert S. Meline, and Glenn M. Blouin are hereby deleted from the said patent as joint inventors with the said Travis P. Hignett.

[SEAL]

EDWIN L. REYNOLDS,
*First Assistant Commissioner of Patents.*